United States Patent [19]

West et al.

[11] Patent Number: 5,260,545

[45] Date of Patent: Nov. 9, 1993

[54] WELDING POWER SUPPLY

[75] Inventors: John C. West, Eagan; Thomas D. Chandler, Coon Rapids, both of Minn.

[73] Assignee: Century Manufacturing Co., Minneapolis, Minn.

[21] Appl. No.: 693,912

[22] Filed: Apr. 29, 1991

[51] Int. Cl.⁵ .................................. B23K 9/10
[52] U.S. Cl. ...................... 219/130.1; 219/137.71
[58] Field of Search ........... 219/130.1, 130.31, 130.32, 219/130.33, 137 PS, 137.71; 363/69, 70

[56] References Cited

U.S. PATENT DOCUMENTS

| | | | |
|---|---|---|---|
| 3,069,614 | 12/1962 | Steinert et al. | 219/130.1 |
| 3,337,769 | 8/1967 | Buchanan | 219/130.1 |
| 3,356,928 | 12/1967 | Parrish | 219/130.1 |
| 3,849,627 | 11/1974 | Blavier | 219/137.71 |

FOREIGN PATENT DOCUMENTS

53-113739 10/1978 Japan .................. 219/130.32

Primary Examiner—Clifford C. Shaw
Attorney, Agent, or Firm—Dorsey & Whitney

[57] ABSTRACT

The invention concerns a power supply for an arc welder. A main transformer drives a plurality of secondaries. The invention provides a switching and control system that derives fully rectified power from the secondaries, at an adjustable duty cycle, and applies the power to a welding electrode. One advantage to using a plurality of secondaries is that each supplies part of the total electrode current. Thus, the rectification and duty-cycle control can be accomplished by individual devices (such as SCRs) which are distributed over the secondaries. The total cost of the individual devices can be less than the cost of a single device, of equivalent current capacity, used in a single secondary.

24 Claims, 8 Drawing Sheets

WELDING POWER SUPPLY

The invention relates to power supplies for arc welders, and particularly to welders of the Metal Inert Gas (MIG) type.

BACKGROUND OF THE INVENTION

Figure 1:
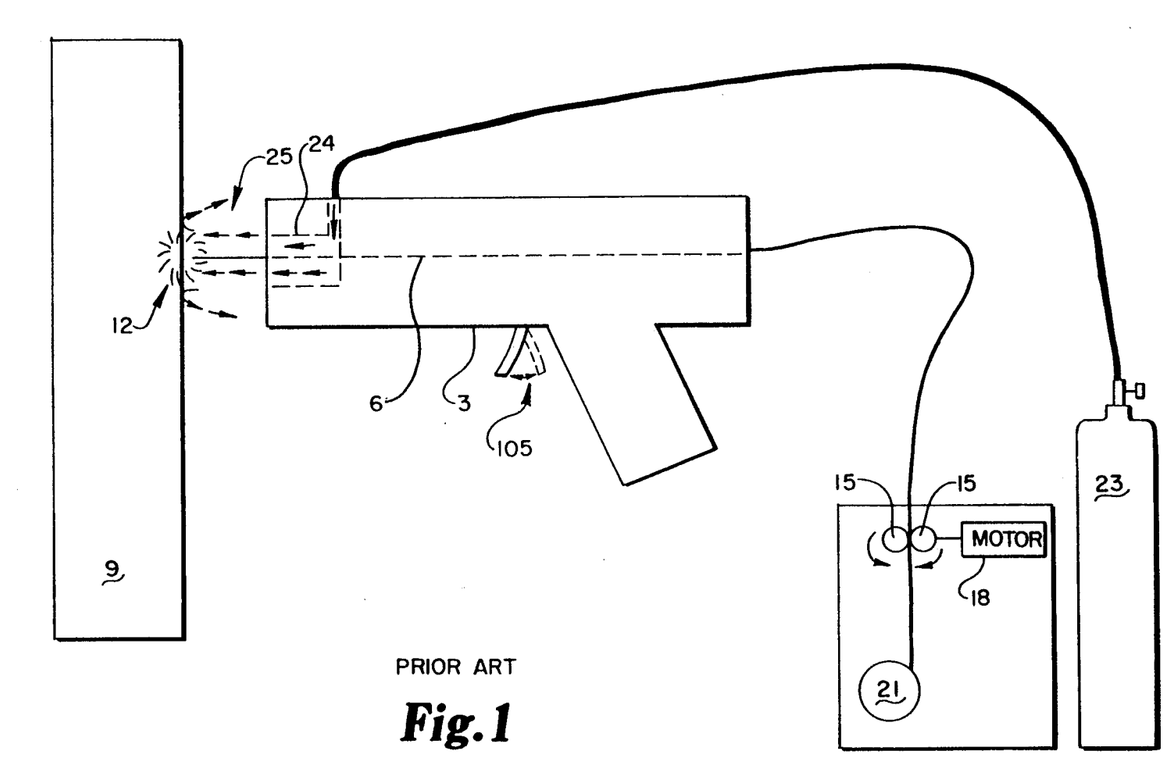
FIG. 1 is a schematic drawing of an arc welder in the prior art.

FIG. 1 is a schematic diagram of a MIG welder. A welding "gun" 3 carries a welding electrode 6 which takes the form of a flexible wire. When an operator (not shown) brings the wire 6 into contact with the object 9 to be welded, an electric arc 12 jumps from the wire 6 to the object 9, fusing them both, and causing a weld puddle (not separately shown) to form. When the wire 6 is withdrawn from the object, the arc is broken, and the weld puddle solidifies.

The wire 6 is consumed during the welding, and so feeder wheels 15, driven by a motor 18, continuously supply additional wire from a storage reel 21. When the object to be welded is a metal that is subject to rapid oxidation by atmospheric oxygen at the high temperatures created by the arc (such as aluminum), an inert gas supply 23 delivered to a nozzle 24 is used to shroud the arc and weld puddle in a cloud 25 of inert gas. The inert gas prevents the oxidation.

Figure 2:
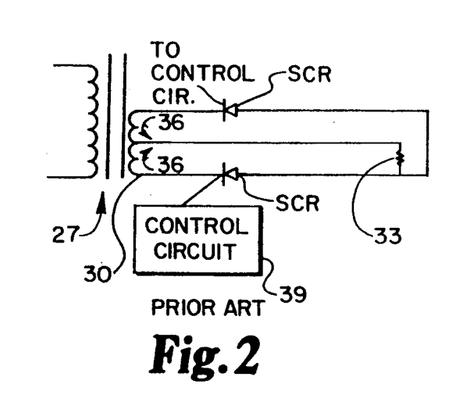
FIG. 2 is a schematic drawing of a power supply in the prior art, used to supply power to a welding electrode.

In the prior art, electric power for a welder is typically supplied by a transformer 27 as shown in FIG. 2. The secondary winding 30 of the transformer 27 delivers power to the welding electrode, indicated as resistive load 33, typically through Silicon Controlled Rectifiers labeled SCR. In operation, the SCRs trigger alternately, one after the other, thus alternately conducting current, as indicated by arrows 36. A control circuit 39 controls the timing of the firing of the SCRs, thus controlling their duty cycle and the power delivered to the load 33.

One characteristic of the system just described is that the SCRs tend to be expensive because they must have a high current-carrying capacity. For example, a single SCR rated at 200 amps can cost substantially more than four SCRs having a 50-amp rating each.

OBJECTS OF THE INVENTION

It is an object of the invention to provide an improved power supply for an arc welder.

It is a further object of the invention to provide a power supply for an arc welder in which expensive switching components are replaced by others of lesser cost.

SUMMARY OF THE INVENTION

In one form of the invention, a power transformer has several secondary windings, divided into two groups. The individual secondaries in each group apply their currents in parallel to the electrode: their currents are summed at the electrode. A switching circuit causes one group to conduct during the positive half-cycle of a 60 Hz wave, and apply its current to the welding electrode. Then, the switching circuit causes the other group to apply its current during the negative half-cycle. The groups apply their currents to the electrode such that, over a full 60 Hz wave, power is applied with full-wave rectification.

Several secondary windings are used, rather than a single secondary, so that the switching can be done by many small SCRs, rather than two large ones. The total cost of multiple small SCRs can be significantly less than a single SCR of the same total current-carrying capacity.

A control system controls the timing of the SCR'S, in order to control the duty cycle of the currents applied to the electrode. The control system thus controls the amount of power delivered to the electrode.

DETAILED DESCRIPTION OF THE INVENTION

Transformer Secondary System

Figure 3:
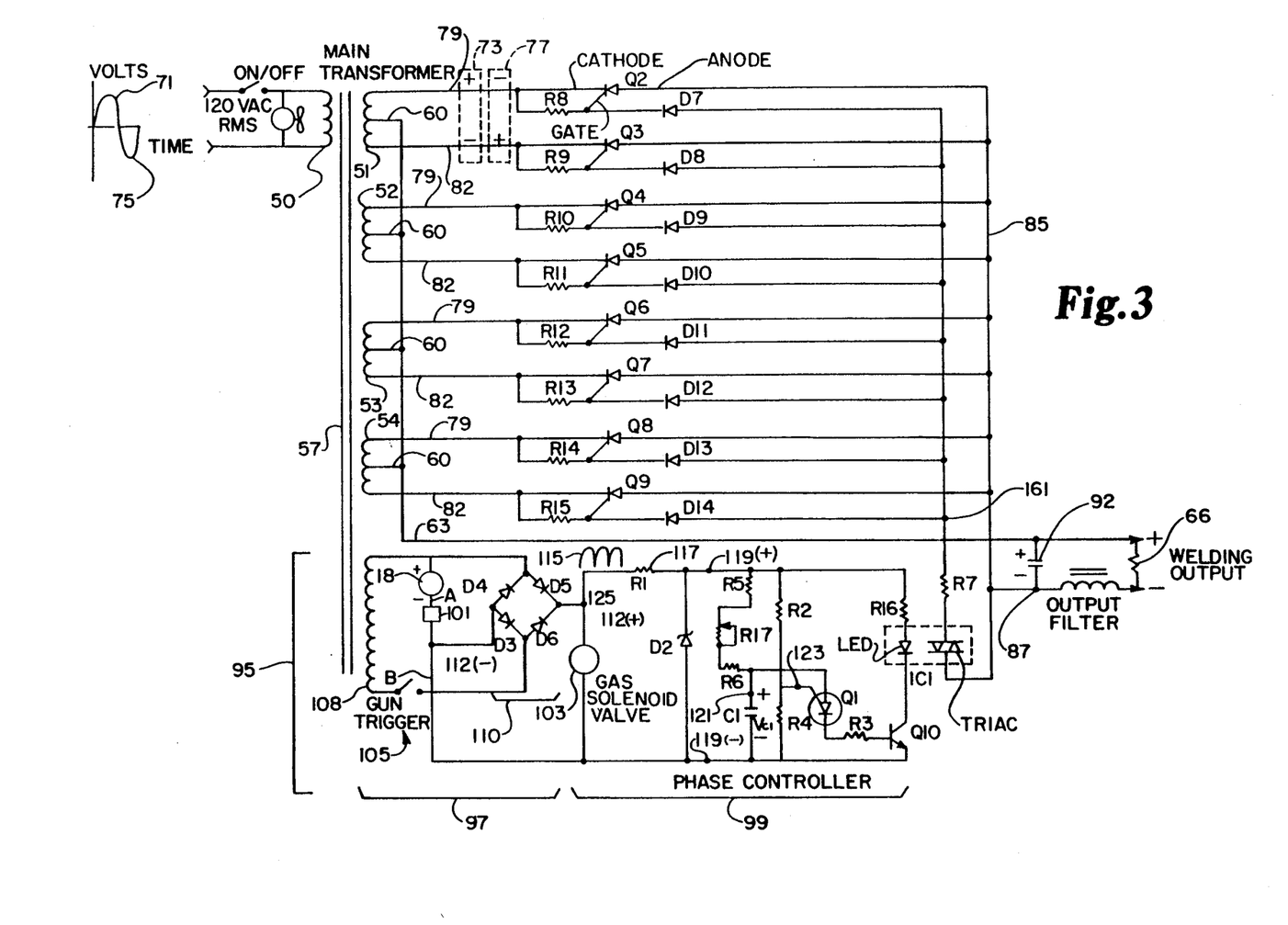
FIG. 3 is a schematic drawing of one form of the invention.
Figure 4A:
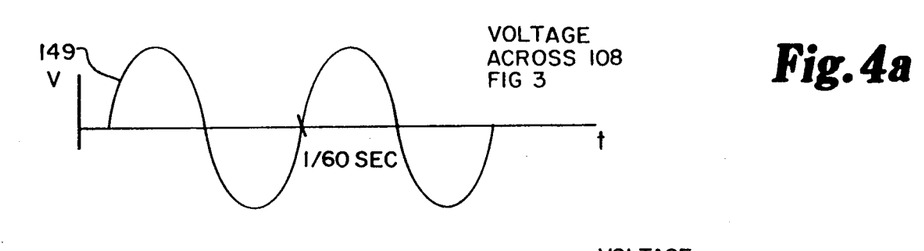
FIGS. 4A through 4E illustrate voltage waveforms occurring at various points in FIG. 3.
Figure 4B:
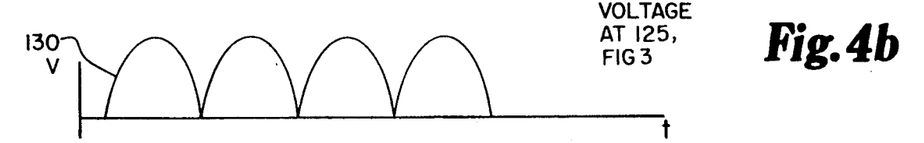
Figure 4C:
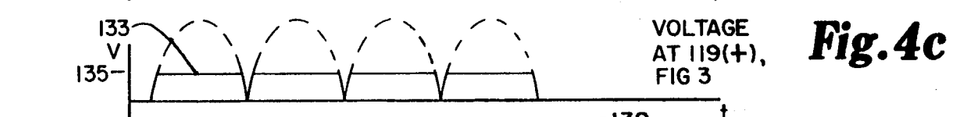
Figure 4D:
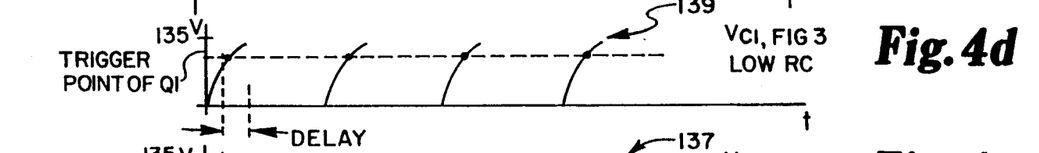
Figure 4E:
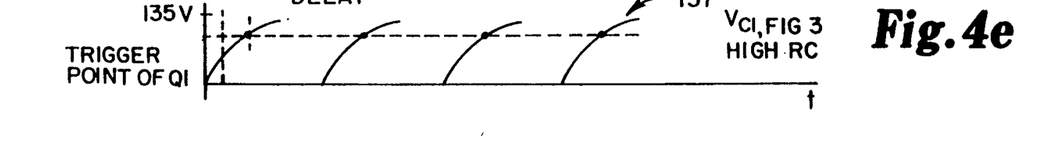

In FIG. 3, a primary winding 50 in a power transformer for a welding power supply carries input current (typically 60 Hz AC, 120 volts RMS). The primary is coupled to four secondaries 51–54, through an iron core 57. Each secondary is center-tapped, and the center taps 60 all connect to a common lead 63, which supplies the welding electrode, indicated as a resistive load 66.

Eight SCRs, labeled Q2 through Q9, control the manner by which the secondary windings supply current to the center taps. In practical effect, the eight SCRs consist of two groups. One group is the odd-numbered SCRs (i.e., Q3, Q5, Q7, and Q9), and the other is the even-numbered SCRs (i.e., Q2, Q4, Q6, and Q8). The operation of the SCRs may be explained as follows.

During the positive swing 71 of the 60 Hz input current, the polarity of the voltage across the two leads of any given secondary is indicated by the pair 73 of plus/minus signs. During the negative swing 75, the polarity is indicated by the pair 77 of plus/minus signs located adjacent the other pair. Each upper lead 79 in FIG. 3 connects to the cathode of an even-numbered SCR.

Each lower lead 82 connects to a cathode of an odd-numbered SCR.

The anodes of the SCRs are all connected together, at node 85, and thus are kept at the same potential. Consequently, at the time when the upper leads 79 of the secondaries become negative, as when the voltage in the secondaries is indicated by plus-minus pair 77, the even-numbered SCRs can be triggered into conduction when a current flows through the odd-numbered diodes. (That is, the cathodes of the even-numbered SCRs become negative with respect to node 87, which is connected to the base of smoothing capacitor 92.) Then, when the lower leads of the secondaries become negative, as indicated by plus/minus pair 73, the odd-numbered SCRs can be triggered, for the same reasons as given above, and, further, the even-numbered SCRs become shut off at this time. Then this cycle repeats.

The resistors R8–R15 are "pull-down" resistors, which pull the SCR gates to cathode potential, in order to prevent spurious triggering of the SCRs.

Control System

All the SCRs Q2 through Q9 are triggered by a single control circuit 95, which can be divided into a power section 97 and a triggering section 99 (or phase controller). The power section 97 provides three functions: (1) it supplies power to the triggering section 99, which enables the SCRs to operate as described above, (2) it supplies power to the wire feed motor 18 (also shown in FIG. 1) and its associated control 101, and (3) it supplies power to a solenoid valve 103 which supplies the inert gas to the weld puddle. The power section 97 is switched into operation in response to closure of a switch 105, which is located on the gun 3 shown in FIG. 1. When the switch is closed, the power section 97 initiates the three functions.

The power section 97 is powered by a fifth secondary winding 108 of the power transformer. The fifth secondary drives a diode bridge 110, which provides power at full-wave rectification across points 112(+) and 112(−), as indicated by the rectified wave 115. The rectified wave powers the gas solenoid valve 103, which controls delivery of the inert gas, as described above.

The solenoid valve requires about 24 volts, and so the fifth secondary 108 is constructed to provide about 30 volts AC RMS to the diode bridge 110, in order to supply the required 24 volts. However, 24 volts exceeds the voltage needed by the triggering circuit 99, so the triggering circuit 99 is fed through resistor 117, causing a voltage drop across the resistor. Further, a zener diode D2 clamps the voltage across points 119(+) and 119(−), preferably to five volts. The trigger circuit 99 thus receives power at five volts.

The trigger circuit includes a Programmable Unijunction Transistor (PUT) Q1, which triggers a Bipolar Junction Transistor (BJT) Q10. The BJT applies power to a Light-Emitting Diode (LED), which illuminates an optically-triggered TRIAC (or thyristor), both located in Integrated Circuit IC1. When the TRIAC is triggered, the SCRs Q2–Q9 become enabled to perform the switching functions described above; otherwise, the SCRs behave as open circuits.

Optical triggering is used as a simple means of voltage isolation between the SCR gates Q2–Q9 and the PUT triggering circuit 99. A thyristor is used to latch the otherwise short duration trigger pulse for the duration of the half cycle. That is, if the trigger pulse is too short, Q1 may not latch because of insufficient current flowing through R6. Further, an optical TRIAC is used, which conducts current in both directions, even though the gate currents to the SCRs flow in a single direction. One reason is that such TRIAC's have been found to be less expensive than one possible alternative, namely, an optically triggered SCR.

The timing of firing of the TRIAC is controlled by the components located immediately to the left of PUT Q1. Adjustment of R17 changes the time constant of the network including resistors R5, R6, R17 and capacitor C1. Changing the time constant changes the rate of rise of the voltage at point 121, which is the voltage of the anode of the PUT. When this anode voltage reaches the voltage of the gate 123, which acts as a reference voltage, the PUT triggers into conduction. An example will illustrate this triggering.

FIGS. 4A–4E show a timing diagram of several waveforms occurring in the circuit in FIG. 3. Waveform 149 in FIG. 4A appears across the secondary 108. Waveform 130 in FIG. 4B appears across the gas solenoid 103, at point 125, and its peak is at about 42.5 volts. Waveform 133 in FIG. 4C appears across the zener diode D2 in FIG. 3. The zener clamps the voltage at value 135 in FIGS. 4D and 4C, which is preferably 5 volts, as stated above.

The zener voltage at point 119(+) in FIG. 3 pulls up the voltage $V_{C1}$ (at the anode of PUT Q1), and the rise time of $V_{C1}$ depends on the RC time constant of the following combination: resistors R5, R6, and adjustable R17, together with capacitor C1. When $V_{C1}$ reaches the voltage at the gate of the PUT, as stated above, the PUT triggers. Accordingly, a large RC constant will delay triggering of the PUT, as indicated by waveform 137 in FIG. 4E, as compared with the waveform 139 (in FIG. 4D) caused by a smaller RC constant. Thus, the RC constant, which is controlled by R17, controls the time of firing of the PUT, and thereby controls the duty cycles of the SCRs. Controlling the duty cycle of the SCRs controls the power delivered to the welding electrode (i.e., load 66).

Feed Motor Control

As stated above, closure of switch 105 in FIG. 3 initiates wire-feeding by the wirefeed motor 18, which is a DC motor. The speed of wire advancement is controlled by a motor control 101, connected in series with the motor 18, as will now be explained in connection with FIG. 5.

Figure 5:
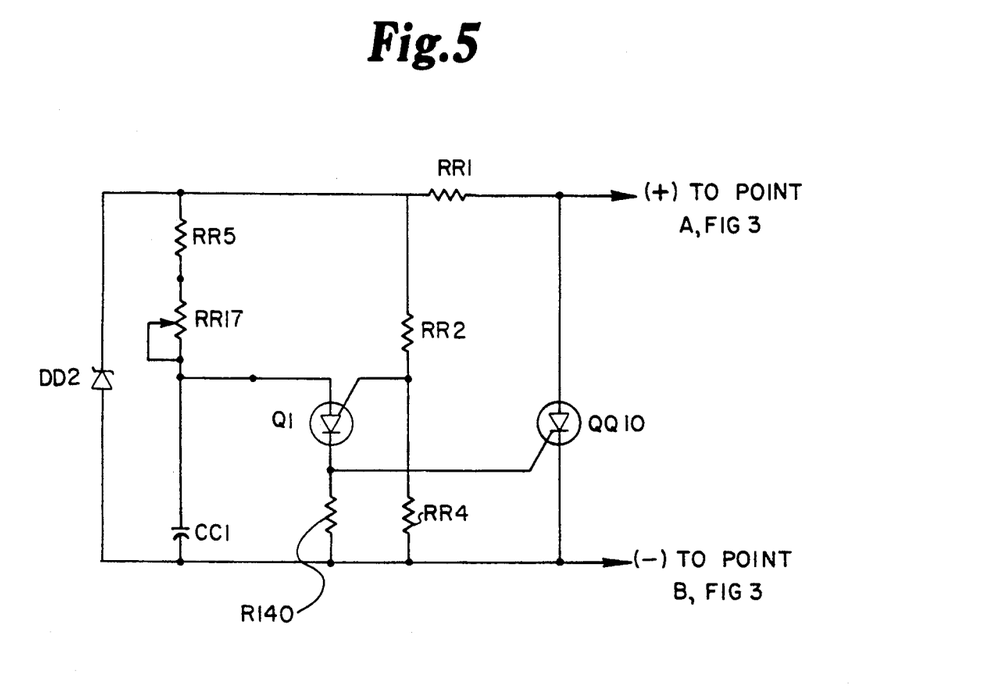
FIG. 5 is a schematic drawing of a control circuit for the motor 18 in FIG. 1.

The operation of the motor controller 101 in FIG. 5 is similar to the triggering circuit 99 in FIG. 3. Accordingly, analogous components are similarly labeled in the two Figures. For example, in the motor controller, resistor RR5 is analogous to resistor R5 in FIG. 3. One difference lies in resistor R3 in FIG. 3, as compared with resistor R140 in FIG. 5. When examined in detail, they operate by different mechanisms. However, they are analogous in the sense that, when a voltage is applied to them, each triggers a respective transistor Q10 or QQ10. In FIG. 5, adjustment of potentiometer RR17 changes the RC time constant, and controls the rise time of the voltage across capacitor CC1, as does R17 in FIG. 3 with respect to capacitor C1.

Because the feed motor 18 and its control 101 are themselves connected in series in FIG. 3, and the series connection is across a single diode D4, the feed motor is powered by halfwave rectified current. Since diode D3 in the bridge must deliver this additional current, it must have a larger capacity than that required in diodes D4, D5, and D6, which do not deliver the additional current.

Powering the motor in this manner allows the use of a low-cost SCR controller as opposed to a controller of either the pulse-width modulation type or linear-pass type. With the SCR controller, double the motor's rated voltage is applied, but only during one-half of a 60 Hz wave. This type of operation typically results in lower torque obtained from the motor, but has been found to be suitable for use with the invention. Several additional features of the invention are the following.

ADDITIONAL FEATURES

Functions of Diodes D7–D14

The diodes in FIG. 3 serve a two-fold purpose. First, they accommodate mismatches in the trigger voltages of different SCRs, and, second, they isolate a triggered SCR from a non-triggered SCR.

As to the first function, if all of the diodes D7–D14 in FIG. 3 were absent (that is, replaced by short circuits), then the SCR having the lowest trigger voltage will trigger into conduction first, thereby disabling triggering of SCRs having higher trigger voltages, because triggering will clamp the gates of the others to near the cathode voltage. This disablement will now be explained, by way of example.

Figure 6:
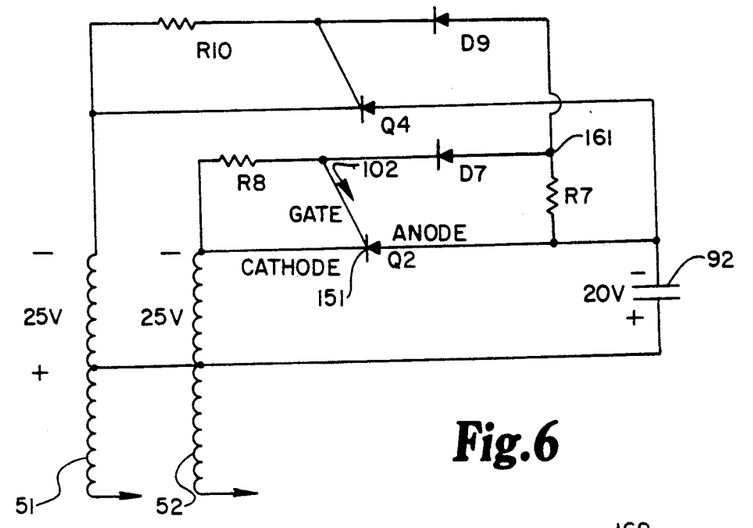
FIGS. 6, 7, and 8 illustrate how diodes such as D7 and D8 assist in triggering of the SCRs such as Q2 and Q3.

FIG. 6 shows two secondary windings 51,52 as in FIG. 3, but redrawn for simplicity. For this example, it is assumed that (a) the capacitor 92 carries a voltage of 20 volts and (b) the secondary carries a voltage of 25 volts, both as indicated. That is, a five-volt drop occurs across the SCR Q2, with the anode being positive. This five-volt drop also appears across the series combination of resistor R8, gate diode D7 and gate resistor R7.

Figure 7:
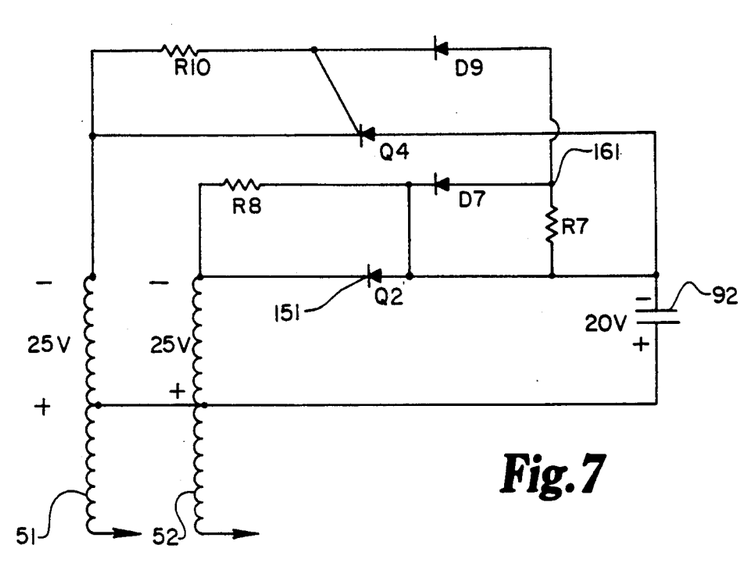
Figure 8:
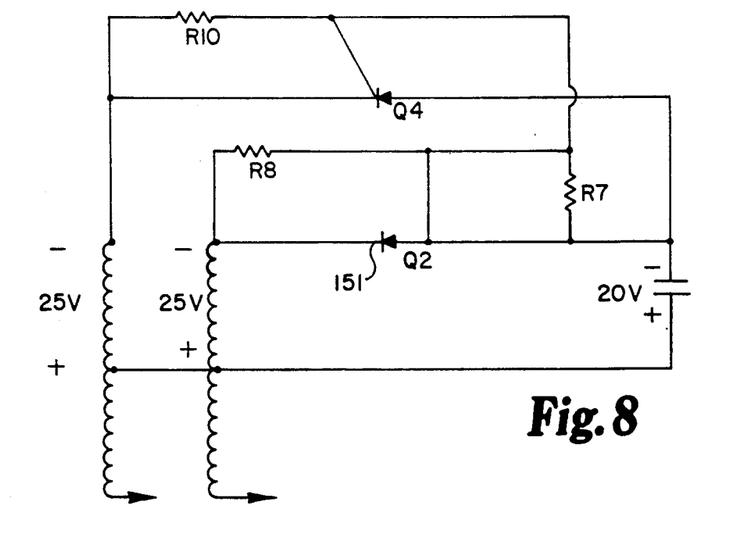

With this five-volt drop, a gate current 102 flows and triggers the SCR Q2 into conduction. When Q2 conducts, the circuit, in effect, becomes that shown in FIG. 7: Q2 is shown as a diode. The gate lead of Q2 is now brought within one diode voltage drop of the cathode of the Q2. If the gate of Q4 were directly connected to this gate, as would occur if the diodes D7–D14 were absent, as shown in FIG. 8, then the gate of Q4 would be held at the same potential as the gate of Q2, namely, at one diode drop above the voltage of cathode 151. If the triggering voltage of Q4 were higher than this potential, Q4 would not trigger.

The diodes D7–D14 in FIG. 3 prevent this situation. The diodes raise the potential of node 161 (also shown in FIG. 7) by an additional diode drop from the cathode's potential (namely, that of diode D7 in FIG. 7), in addition to the diode representing the gate-cathode drop in Q2. Now, the gate of Q4 is not pulled to the low voltage level of the cathode of Q2 plus one diode drop. The triggering is not prevented. The same situation as appears in FIG. 7 occurs as well as at the other gates.

Figure 15:
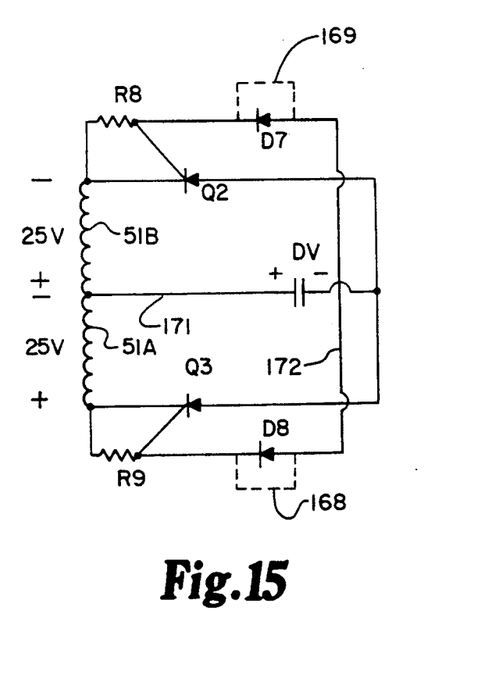
FIG. 15 illustrates how diodes D7 and D8 prevent undesired triggering of the SCRs, such as Q2.

In addition, the diodes D7–D14 serve a second function. FIG. 15 shows one secondary winding as in FIG. 3 but redrawn for simplicity. Resistor R7 has been removed to show the circuit during the period when the output is off. It can be shown that no voltage appears across the series combination of resistors R8 and gate diode D7 and therefore SCR Q2 is not triggered. If diodes D7 and D8 were absent, as indicated by phantom conductors 168 and 169, point 172 would be brought to approximately the potential of point 171, thus turning on SCR Q2. With the two diodes D7 and D8, an SCR as Q2 in FIG. 15 is prevented from being triggered by the voltage appearing across the opposite half-winding 51A. Diode D8 prevents application of this voltage to the gate of Q2.

Re: Multiple Secondaries and Multiple SCRs

Figures 9, 12:
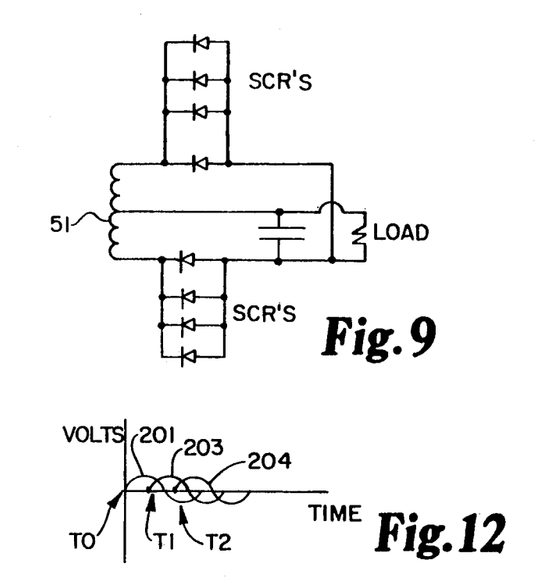
FIG. 9 is a schematic illustrating how a single SCR in FIG. 2 could, in theory, be replaced by multiple, smaller SCRs.
FIG. 12 illustrates waveforms produced by the secondaries in FIG. 11.

It may be thought that the cost-saving feature of replacing large SCRs by several smaller ones in parallel could be attained by the expedient shown in FIG. 9, in which a single secondary winding feeds two sets of SCRs, each containing four SCRs in parallel. However, this arrangement presents a problem in synchronous firing of the SCRs, similar to that described above. Further, if a single SCR should fail in FIG. 9, the total current will then be distributed among the remaining SCRs, which can become overloaded. One solution to the overloading problem is to use larger SCRs, but this defeats the initial goal of reducing cost by using smaller SCRs.

Invention Operates Differently in One Type of Failure Mode

It is significant that the arrangement of FIG. 3 provides a different type of operation in one type of failure mode than does the prior art arrangement of FIG. 2. That is, if a single SCR fails in the prior art circuit of FIG. 2, then an entire half-wave of the 60 Hz current is lost at the output. However, if a single SCR in FIG. 3 is lost, only ¼ the current of one halfwave is lost, or ⅛ the current total. Further, loss of a single SCR in FIG. 9 (discussed in the paragraph immediately above) causes an overloading of the remaining SCRs, but no loss in current.

DEFINITIONAL MATTERS

Re: "Positive Lead" of Secondary

Each secondary, such as 51 in FIG. 3, can be viewed as having a positive lead, such as lead 79, and a negative lead, such as lead 82. The terms "positive" and "negative," in this case, refer to the fact that, during any given half-cycle of input current, the leads will be of opposite polarity, as the pairs of plus/minus signs 73 and 77 indicate.

Further, even though the "positive" lead will not always be positive with respect to the negative lead, the "positive" lead will be positive in this respect at periodic times, namely during one or the other of the half-cycles of the input current.

Re: "Fully Rectified" and "Duty Cycle"

As discussed above, the time at which the SCRs fire can be controlled. If the SCRs were all conducting at all times, the waveform applied to the output capacitor 92 would be that shown in phantom in FIG. 10A. If the SCRs fire early, the waveform resembles waveform 150 in FIG. 10B. If the SCRs fire late, the waveform resembles waveform 155 in FIG. 10C. Clearly, the SCRs control the duty cycle of the waveform applied to the electrode, meaning that, from one point of view, the SCRs control what fraction of the power in a 60 Hz wave is applied to the electrode from the secondary.

Figure 10A:
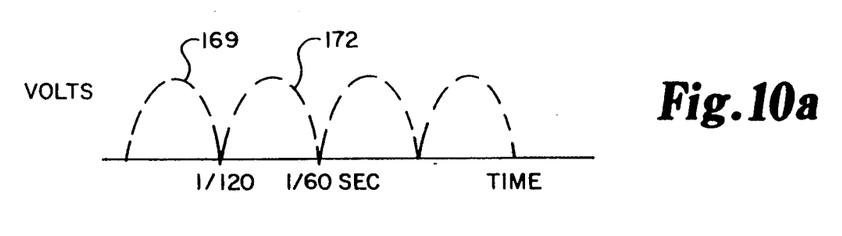
FIGS. 10A through 10C illustrate waveforms produced by the SCRs, and show how delay of triggering can reduce the duty cycle, and thus reduce the power delivered.
Figure 10B:
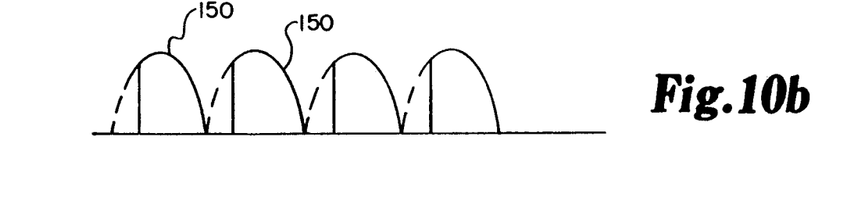
Figure 10C:
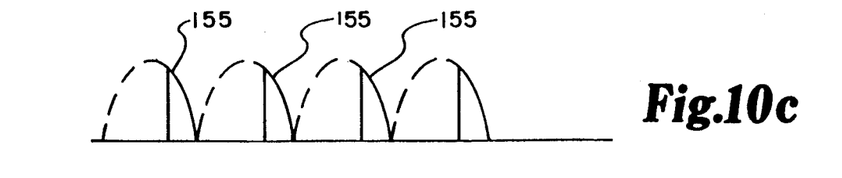

Moreover, the wave whose duty cycle is controlled is fully rectified. For example, the phantom waveform in FIG. 10A is full-wave rectified: both half-cycles 169 and 172 are of the same polarity; in contrast, half-cycles 71 and 75 in FIG. 3 are not. Further, the partial half-cycles 150 and 155 in FIGS. 10B and 10C are also fully rectified: they are all of the same polarity, again as opposed to half-cycles 71 and 75 in FIG. 3.

In addition, the waveform (not shown) applied to the combination of motor 18 and motor controller 101 in FIG. 3 is half-wave rectified and controlled in duty cycle.

Re: "Parallel"

The preceding discussion has referred to a single-phase system, in which a transformer primary 50 in FIG. 3 powers multiple secondaries, such as 51 and 52, which supply power, in parallel, to a common load 66. It is noted that multi-phase transformers exist which may appear, on paper, to provide multiple secondaries that supply power in parallel to a common load, but that actually do not.

Figure 11:
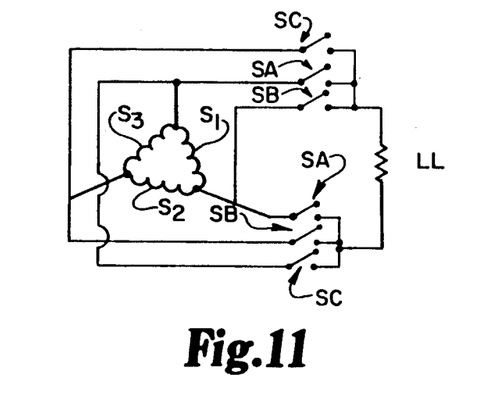
FIG. 11 illustrates a three-phase circuit which may appear to employ parallel secondaries, but, which, in fact, does not.

FIG. 11 illustrates one such a transformer, but in oversimplified form, in order to illustrate the definitional principles involved. Secondaries S1, S2, and S3 are powered by respective primaries, which are not shown. SA, SB and SC represent paired switches used to apply three different current phases. The following sequence of events is assumed, and FIGS. 11 and 12 are considered together.

Whenever a pair of switches is closed, all other switches are open. First, the pair of switches SA closes at time T0 in FIG. 12; next, the pair SB closes at time T1 in FIG. 12; then, the pair SC closes at time T2 in FIG. 12. This sequence applies the positive half-waveforms 201, 203, and 204 in FIG. 12 (produced by respective secondaries S1, S2, and S3 in FIG. 11) to the load LL in FIG. 11, in sequence. However, despite the fact that the circuit diagram may appear to show a parallel connection to the load LL in FIG. 11, the connection is not parallel. The voltages across the leads of the secondaries are not equal; they are phase-separated by 120 degrees. Thus, such prior art would not produce the coordinated summed currents developed in the parallel connections described for the present invention. The phase differences would prevent the various secondary currents from working in coordination as intended in the present invention.

Re: "Bifilar" or "Multifilar"

Figure 13:
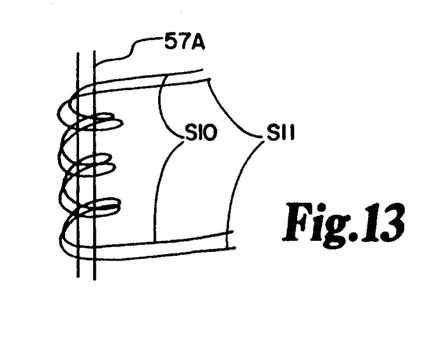
FIG. 13 schematically illustrates bifilar winding of coils.
Figure 14:
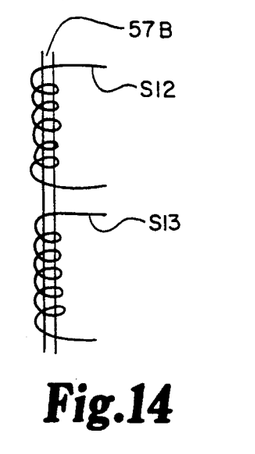
FIG. 14 schematically illustrates conventional winding of coils.

It is preferred that the transformer wound about core 57 in FIG. 3 be bifilar-wound or multifilar-wound. "Bifilar-wound" means that two secondaries are wound about a common length of core. Multifilar-wound refers to the more general case, where two or more secondaries are wound about a common length of core. In the simplified diagram in FIG. 13, two secondaries S10 and S11 are shown as wound in this manner about core 57A. By contrast the transformer shown in FIG. 14 is not multifilar-wound, because the secondaries surround different lengths of the core 57B. For example, secondary S12 is at a different axial position than secondary S13.

Because with multifilar winding all secondaries couple to the same region of the core, they couple to the same magnetic flux. By comparison, the secondaries in FIG. 14 do not all couple to identical fluxes, because the flux density varies along the length of the core, due to factors such as leakage. Coupling to a common flux by multifilar winding promotes current balance in the secondaries.

In multifilar wound transformers, all secondaries preferably are wound at the same time, by the same winding device. (That is, one secondary is not fully wound, followed by another, and so forth.) This type of winding assures that all secondaries possess an identical number of turns about the core and all secondaries are almost exactly the same distance from the center of the core. Thus, all secondaries will equally share the commonly-available flux and produce the same current, again promoting balanced current to the load.

It is recognized that careful sequential winding of multiple secondaries about a common length of core can sometimes provide the features of a "multifilar-wound" transformer. This fact of sequential winding will not prevent such a transformer from qualifying as "multifilar-wound," as long as the windings are equivalent, in a flux-sharing sense, to windings laid down simultaneously.

Numerous substitutions and modifications can be undertaken without departing from the true spirit and scope of the invention as defined in the claims. What is desired to be secured by Letters Patent is the invention as defined in the following claims.

We claim:

1. In an arc welder having a single-phase power transformer for supplying power to a welding electrode, the improvement comprising:
   a) a plurality of secondary windings powered by the transformer; and
   b) means for
      i) deriving power at full-wave rectification from the secondary windings, with each secondary winding providing only a predetermined portion of the total power derived, and wherein the power from each secondary winding is in phase with the power of the other secondary windings; and
      ii) delivering the summed power in a single phase to the welding electrode.

2. Apparatus according to claim 1 and further comprising:
   c) means for controlling the amount of power delivered to the welding electrode.

3. Apparatus according to claim 1 and further comprising:
   c) means for controlling the power delivered to the welding electrode, by controlling the duty cycle of the full-wave rectification.

4. Apparatus according to claim 1 and further comprising:
   c) a first control system for allowing an operator to control the power delivered to the welding electrode;
   d) a motor for feeding the welding electrode to a weld;
   e) a power supply for driving the motor, comprising:
      i) a secondary winding on the transformer;
      ii) a diode bridge for providing current at full-wave rectification to the first control system; and
      iii) a tap on the diode bridge for providing current at half-wave rectification to the motor; and
   f) a second control system for allowing an operator to control the power delivered to the motor by the tap.

5. An apparatus according to claim 1 wherein the predetermined portion of the total power provided by each secondary winding is substantially equally balanced among the secondary windings.

6. A power supply for an arc welder, comprising:
   a) a single-phase primary coil which drives a plurality of transformer secondaries, with each secondary providing only a predetermined portion of the total power provided by all the transformer secondaries, and wherein the power portion from each transformer secondary is in phase with the power portion of the other transformer secondaries; and b) switching means for periodically connecting the secondaries in parallel with a welding electrode to deliver single-phase power that is the sum of the power portions from all transformer secondaries.

7. Apparatus according to claim 6 and further comprising:

c) control means for controlling the duration of the connection of the secondaries to the welding electrode.

8. A power supply according to claim 6 wherein the predetermined portion of the total power provided by each transformer secondary is substantially equally balanced among the transformer secondaries.

9. Power supply for an arc welder, comprising:

a) a single-phase transformer which includes a primary winding and a plurality of secondary windings, with each secondary winding providing only a predetermined portion of the total power available from all the secondary windings, and wherein the power portion from each secondary winding is in phase with the power portion of the other secondary windings;

b) means for rectifying the outputs of the secondary windings and applying the rectified outputs in parallel to a welding electrode to deliver single-phase power that is the sum of the power portions from all secondary windings; and c) means for controlling the amount of power delivered by the secondary windings to the welding electrode.

10. A power supply according to claim 9 wherein the predetermined portion of the total power provided by each secondary winding is substantially equally balanced among the secondary windings.

11. A power supply for a welder, comprising:

a) a single-phase, multifilar-wound transformer having i) a plurality of substantially identical secondary windings; and ii) a primary which receives alternating current (AC) from a source;

b) switching means for connecting one group of the secondaries in parallel to a load during positive half-cycles of the AC, and for connecting another group of the secondaries in parallel to the load during negative half-cycles of the AC, such that a single-phase current flows through the load in a single direction and each secondary supplies only a predetermined portion of the total current provided by all secondaries in its group, and wherein the current portion from each secondary winding is in phase with the current portion of the other secondary windings.

12. Apparatus according to claim 11 and further comprising:

c) means for controlling the relative times, during the positive and negative half-cycles, at which the respective secondaries become connected.

13. A power supply according to claim 11 wherein the predetermined portion of the total current supplied by each secondary winding is substantially equally balanced among the secondary windings.

14. A power supply for an arc welder, comprising:

a) a single-phase transformer to which alternating current having two half cycles is supplied, which includes i) a primary winding and ii) N secondary windings, wherein N is greater than one, each having a positive lead, a negative lead, and a center tap;

b) a first output line, connected to all center taps;

c) a first plurality of SCRs, the cathode of each connected to a respective positive lead, with each such SCR carrying only a predetermined portion of the total current carried by the first plurality of SCRs;

d) a second plurality of SCRs, the cathode of each connected to a respective negative lead, with each such SCR carrying only a predetermined portion of the total current carried by the second plurality of SCRs;

e) a second output line, connected to all anodes of the SCRs; and f) trigger means for i) causing the first plurality of SCRs to conduct during one half-cycle of input current, and ii) causing the second plurality of SCRs to conduct during the other half-cycle of input current.

15. Apparatus according to claim 14 in which the trigger means comprises: a plurality of diodes, each being (A) connected to a gate of a respective SCR and (B) able to receive current from the second output line.

16. Apparatus according to claim 15, and further comprising g) a switch for interrupting current through said diodes; and h) a control means, comprising:

i) a diode bridge powered by a secondary winding on the transformer, and providing a voltage at full rectification;

ii) an adjustable voltage divider for providing a fraction of said full-rectified voltage at a node; and iii) comparison means for comparing said fraction of said full-rectified voltage with a reference voltage, and actuating said switch when said fraction reaches said reference voltage.

17. A power supply according to claim 14 wherein each SCR in the first plurality of SCRs provides a predetermined portion of the total power that is substantially equally balanced among the SCRs in the first plurality of SCRs and each SCR in the second plurality of SCRs provides a predetermined portion of the total power that is substantially equally balanced among the SCRs in the second plurality of SCRs.

18. A power supply for an arc welder, comprising:

a) a single-phase transformer having a plurality of secondary windings, i) all said secondary windings being connected in parallel to a pair of output terminals and each having an SCR for controlling current to the output terminals; and ii) means for actuating the SCRs such that alternate groups of the secondary windings supply current in a single phase to the output terminals, with each SCR in a group supplying only a predetermined portion of the total current available from its group of SCRs; and b) control means connected to said SCRs for controlling the amount of power delivered to the output terminals.

19. A power supply according to claim 18 wherein the predetermined portion of the total current supplied by each SCR in each alternate group of SCRs is substantially equally balanced among the SCRs in each alternate group of SCRs.

20. A power supply for an arc welder, comprising:
   a) a single-phase, multifilar-wound transformer having a plurality of secondary windings;
   b) two groups of two or more SCRs each, each SCR
      i) for connecting a respective secondary winding to a common load and carrying only a predetermined portion of the total current supplied to the load by its group, and
      ii) poled such that both groups supply current to the load in the same direction;
   c) trigger means for selectively triggering all SCRs in one group alternately with all SCRs in the other group; and
   d) means for preventing a triggered SCR from interfering with triggering of another SCR in the same group, and for preventing undesired turn-on of an SCR in the other group.

21. A power supply according to claim 20 wherein the predetermined portion of the current supplied by each SCR in the each of the two or more group of SCRs is a portion of the total current that is substantially equally balanced among the SCRs in each of the two or more group of SCRs.

22. In an arc welder having a single-phase power transformer for supplying power to a welding electrode, the improvement comprising:
   a) a plurality of secondary windings powered by the transformer;
   b) means for
      i) deriving power at full-wave rectification from the secondary windings, with each secondary winding providing only a predetermined portion of the total power derived, and
      ii) delivering the summed power in a single phase to the welding electrode; and
   c) means for controlling the power delivered to the welding electrode, by controlling the duty cycle of the full-wave rectification.

23. A power supply for an arc welder, comprising:
   a) a single-phase primary coil which drives a plurality of transformer secondaries, with each secondary providing only a predetermined portion of the total power provided by all the transformer secondaries;
   b) switching means for periodically connecting the secondaries in parallel with a welding electrode to deliver single-phase power that is the sum of the power portions from all transformer secondaries; and
   c) control means for controlling the duration of the connection of the secondaries to the welding electrode.

24. A power supply for a welder, comprising:
   a) a single-phase, multifilar-wound transformer having
      i) a plurality of substantially identical secondary windings, and
      ii) a primary which receives alternating current (AC) from a source;
   b) switching means for connecting one group of the secondaries in parallel to a load during positive half-cycles of the AC, and for connecting another group of the secondaries in parallel to the load during negative half-cycles of the AC, such that a single-phase current flows through the load in a single direction and each secondary supplies only a predetermined portion of the total current provided by all secondaries in its group; and
   c) means for controlling the relative times, during the positive and negative half-cycles, at which the respective secondaries become connected.

* * * * *